US012789701B2

(12) United States Patent
Janzer et al.

(10) Patent No.: US 12,789,701 B2
(45) Date of Patent: Nov. 10, 2026

(54) RADAR-COMPATIBLE EXTERNAL DISPLAY DEVICE FOR A VEHICLE

(71) Applicant: Bayerische Motoren Werke Aktiengesellschaft, Munich (DE)

(72) Inventors: Michael Arthur Janzer, Unterschleissheim (DE); Bernhard Rother, Grosskarolinenfeld (DE); Armin Wagner-Gentner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 208 days.

(21) Appl. No.: 18/708,965

(22) PCT Filed: Sep. 21, 2022

(86) PCT No.: PCT/EP2022/076246
§ 371 (c)(1),
(2) Date: May 9, 2024

(87) PCT Pub. No.: WO2023/104364
PCT Pub. Date: Jun. 15, 2023

(65) Prior Publication Data

US 2025/0001932 A1 Jan. 2, 2025

(30) Foreign Application Priority Data

Dec. 10, 2021 (DE) ..................... 10 2021 132 729.6

(51) Int. Cl.
*B60Q 1/50* (2006.01)
*G01S 7/03* (2006.01)
*G01S 13/931* (2020.01)

(52) U.S. Cl.
CPC ................ *B60Q 1/543* (2022.05); *G01S 7/03* (2013.01); *G01S 13/931* (2013.01); *G01S 2013/93277* (2020.01)

(58) Field of Classification Search
CPC ........ B60Q 1/543; B60Q 1/545; B60Q 1/525; G01S 7/03; G01S 13/931;
(Continued)

(56) References Cited

U.S. PATENT DOCUMENTS 6,380,883 B1 * 4/2002 Bell ..................... G01S 13/931 342/70
6,821,003 B2 * 11/2004 Baker ..................... G01S 13/86 362/276
(Continued)

FOREIGN PATENT DOCUMENTS

DE 103 30 906 A1 2/2004
DE 10 2011 115 829 A1 4/2013
(Continued)

OTHER PUBLICATIONS

Entry for the word, "pixel" in the dictionary at merriam-webster.com; no author given; retrieved on Jul. 7, 2026. (Year: 2026).*
(Continued)

*Primary Examiner* — Bernarr E Gregory
(74) *Attorney, Agent, or Firm* — Crowell & Moring LLP

(57) ABSTRACT

A radar-compatible external display device for a vehicle includes a display element for producing a light display external to the vehicle. The display element is disposed in the beam path of a radar system of the vehicle. Each pixel of the display element includes a transparent diffuser assembly and an electrically controllable light source or a deflecting element. Linear dimensions of the display light sources/deflecting elements are several times smaller than a predefined radar wavelength used in the radar system, while distances between adjacent light sources/deflecting elements are greater than said radar wavelength. As a result, radar radiation of the radar system of the vehicle propagates through the display element undisturbed.

10 Claims, 3 Drawing Sheets

(58) Field of Classification Search
CPC ........... G01S 2013/93277; G01S 13/86; G01S 2013/93275; G01S 7/487; G01S 7/027; B60R 13/04; G02F 1/133615; F21S 41/635; F21V 9/32
See application file for complete search history.

(56) References Cited

U.S. PATENT DOCUMENTS

| | | | | |
|---|---|---|---|---|
| 9,896,023 | B1 * | 2/2018 | Salter | B60Q 1/525 |
| 11,845,376 | B2 | 12/2023 | Junghaehnel et al. | |
| 2008/0180965 | A1 * | 7/2008 | Nakamura | G01S 7/027 362/507 |
| 2009/0086466 | A1 * | 4/2009 | Sugita | G02F 1/133615 362/97.1 |
| 2015/0177374 | A1 | 6/2015 | Driscoll et al. | |
| 2015/0252984 | A1 * | 9/2015 | Van Bommel | F21V 9/32 362/84 |
| 2018/0073700 | A1 * | 3/2018 | Orisich | F21S 41/635 |
| 2019/0140344 | A1 * | 5/2019 | Kirino | G01S 7/03 |
| 2019/0301703 | A1 * | 10/2019 | Petit | B60Q 1/545 |
| 2020/0137373 | A1 * | 4/2020 | Iguchi | G01S 7/487 |
| 2021/0382321 | A1 * | 12/2021 | Khayat | B60R 13/04 |

FOREIGN PATENT DOCUMENTS

| | | | |
|---|---|---|---|
| DE | 10 2018 217 774 | A1 | 4/2020 |
| WO | WO 2016/089926 | A1 | 6/2016 |
| WO | WO 2021/122554 | A1 | 6/2021 |
| WO | WO 2021/125047 | A1 | 6/2021 |

OTHER PUBLICATIONS

International Search Report (PCT/ISA/210) issued in PCT Application No. PCT/EP2022/076246 dated Jan. 3, 2023 (2 pages).
German-language German Search Report issued in German Application No. 10 2021 132 729.6 dated Jul. 12, 2022 with partial English translation (6 pages).

* cited by examiner

RADAR-COMPATIBLE EXTERNAL DISPLAY DEVICE FOR A VEHICLE

CROSS REFERENCE TO RELATED APPLICATION

This application is a 371 of International Application No. PCT/EP2022/076246, filed Sep. 21, 2022 which claims priority under 35 U.S.C. § 119 from German Patent Application No. 10 2021 132 729.6, filed Dec. 10, 2021, the entire disclosure of which is herein expressly incorporated by reference.

BACKGROUND AND SUMMARY

The invention relates to external indication devices for a motor vehicle or any other land vehicle, aircraft or watercraft. It may relate to any type of external indication means, for example outside displays or else light display apparatuses such as headlamps or stop lamps which are provided for observers outside of the vehicle, for instance for other road users or passersby. In this context, the device comprises an extensive indication element which is composed of a multiplicity of pixels.

Conventional displays, for instance LCDs (liquid crystal displays) or OLED (organic light-emitting diode) displays require large-area electrically conductive layers which are opaque to a radar system, for example as used in automobiles. Hence, it is not possible to use conventional displays in the front region in front of the radar system. Indication systems operating with front projection, for example by way of a projector housed in the bumper and a diffusion screen arranged in front of the radar system, are likewise inexpedient on account of the statutory requirements with regard to robustness in the case of slight rear-end collisions.

Hence, it is currently not possible to realize an external indication means installed for example in the front end of a vehicle in the beam path of a vehicle's own radar system. However, the communication of the vehicle with its surroundings is becoming increasingly more important, especially in view of future developments such as automated driving. However, in the same context, it is also important to extend the "field of view" of vehicle-own radar systems ever more and expand it in all directions.

It is therefore an object of the present invention to specify an external indication device for a vehicle which is able to be integrated in the beam path of a vehicle's own radar system.

This object is achieved by a radar-compatible external indication device and by a vehicle equipped therewith as described herein. Further configurations are specified in the dependent claims. All further features and effects specified in the claims and the following description for the external indication device also apply in relation to the vehicle, and vice versa.

According to a first aspect, provision is made for a radar-compatible external indication device which is designed for integration or retrofitting in a vehicle. The vehicle can be a motor vehicle, but also any other land vehicle, aircraft or watercraft.

The external indication device is provided to generate a vehicle-external light display for observers outside of the vehicle, for example for other road users or passersby. To this end, the device comprises an extensive indication element which is composed of a multiplicity of pixels arranged next to one another in the indication surface (cf. FIG. 3). In principle, this can be any type of vehicle external indication means, for example a front display arranged in the region of the engine hood or lower or an external display installed in any other external surface region of the vehicle, a dynamically variable light signature, or else a light indication apparatus such as a headlamp, turn-indicator lamp (direction of travel indicator) or a warning or stop lamp.

In this case, the indication element is designed to be arranged directly in the beam path of a vehicle's own radar system by virtue of each pixel comprising, within its indication surface region, a diffuser arrangement which is largely transparent to radar beams from the vehicle's own radar system and which has arranged on its back side an electrically controllable indication light source which is dimensioned as described below. Instead of the indication light source, each pixel may also comprise a suitable deflection element on its back side, said deflection element deflecting light from an associated indication light source arranged away from the indication element into a predetermined main emission direction of the indication element, wherein for example the main emission direction can correspond simply to a surface normal of the pixel.

Depending on the application, which is to say depending on the type of display to be generated, the individual indication light source may comprise for example one or more light sources such as light-emitting diodes (LEDs), micro-LEDs, laser light sources and many more, optionally having a beam-shaping optical unit, for instance in the form of collimation lenses etc., provided these meet the requirements described herein. Dichroic mirrors in particular, which have a deflective effect only for selected light wavelengths and otherwise transmit electromagnetic radiation in wavelength ranges not used for the display, are suitable as deflection elements. However, in principle, other types of mirror are also suitable as deflection elements.

In this case, linear dimensions, for example edge lengths, of the individual indication light sources or deflection elements in the surface direction of the indication element are multiple times smaller (in particular at least five times, seven times or even ten times smaller) than a predetermined radar wavelength used in the vehicle's own radar system. At the same time, distances between the individual adjacent indication light sources or deflection elements in the surface direction of the indication element are greater than this radar wavelength. Incidentally, the number, shape and arrangement of the individual pixels in the indication surface can be selected freely depending on the application (a few examples thereof are sketched out schematically in FIGS. 3*a*-3*c*).

This configuration, arrangement and dimensioning, also specified in detail below, of all constituent parts of the indication element is configured overall such that radar radiation from the vehicle's own radar system can propagate through the indication element without impediment in relation to the radar function, which is to say for example without spatially dependent or inhomogeneous beam profile changes in the radar beam cross section and/or without a detectable beam deflection and/or without a noticeable attenuation or damping.

In this context, an idea of the radar-compatible external indication device consists of a novel pixel design (cf. FIGS. 2, 4 and 6). This is based on the insight that the demands on a display resolution of an aforementioned front display or of other external display or of any other external light indication means of a vehicle are extremely low, and so it is possible to work with very large pixels with an edge length of 5-15 mm for example. Using a suitable diffuser arrangement within an individual pixel (for example as shown in FIG. 2), it is therefore possible with a representative application and numerical example to realize geometric requirements as set forth below in relation to electrical components of the indication element, and so the latter is passable largely without disturbance by radar radiation of a typical vehicle radar system:

Requirement 1: The size of the indication light sources, for example LEDs, in the individual pixels must be significantly smaller than the wavelength of the radar system. In the case of a typical radar at 76 GHZ, the radar wavelength is approximately 4 mm (the numerical examples provided below need to be scaled accordingly in the case of a different radar wavelength). Thus, the indication light sources should ideally have edge lengths of less than approximately 0.5 mm.

Requirement 2: The distance between the individual indication light sources should be greater than the radar wavelength, which is to say for example greater than 5 mm.

Requirement 3: The electrical supply lines to the individual indication light sources should run orthogonally (i.e., at right angles) to the polarization direction of the radar radiation (cf. FIG. 4).

If all these requirements are met, then the assumption can be made that the indication element has no significant negative influences on the radar function when the radar radiation passes through. The same also applies analogously to the alternative embodiment, in which deflection elements are installed in the pixels rather than the indication light sources (cf. FIGS. 5 and 6). In that case, it is in particular also possible to make do without the third requirement since electrical supply lines can in this case be replaced by light guides, for example optical fibers and many more, made of electrically nonconductive material.

According to an embodiment, a suitable diffuser arrangement of an individual pixel is a sandwich arrangement made of a first diffuser and a second diffuser, which are secured at a predetermined distance d from one another in the direction of a surface normal of the pixel (cf. FIG. 2), for example by virtue of being interconnected by a solid body of an appropriate thickness d which is transparent to the indication light and the radar radiation. In this case, the first diffuser follows the indication light source or the deflection element directly in the light propagation direction of the pixel, which is to say without further optical elements therebetween. The first diffuser is configured to distribute the light generated by the indication light source as uniformly as possible over an entire surface of the second diffuser. At the same time, the entire surface of the second diffuser is an entire surface of the pixel and, for the purpose of generating the display, the second diffuser has a predetermined front-side emission/scattering characteristic for the indication light incident on the back side (i.e., on the side of the first diffuser).

Thus, according to this embodiment, a core concept of the new pixel consists of constructing the diffuser arrangement as a sandwich made of two diffusers, which are for example connected by way of a transparent solid body (e.g., polycarbonate, glass, etc.). The first diffuser faces the indication light source or the deflection element and can in particular immediately adjoin said indication light source/deflection element. Accordingly, the first diffuser may have lateral dimensions in the surface direction of the indication element which approximately correspond to, or are only minimally greater than, those of the indication light source or deflection element. In other words, the first diffuser can be very small in comparison with the pixel size and for example have a diameter or edge length of significantly less than 1 mm in the aforementioned representative numerical example.

In this case, the first diffuser can ideally be designed such that it illuminates the second diffuser, and hence the observer-side pixel surface, as uniformly as possible (cf. FIG. 2). Thus, in a specific configuration, the first diffuser has a scattering characteristic with a substantially homogeneous luminous flux within its emission angle covering the entire surface of the second diffuser. As an alternative or in addition, the first diffuser can have a scattering characteristic with a substantially vanishing luminous flux outside of its emission angle, in order to use light energy as efficiently as possible for the display generation.

It is also advantageous if the first diffuser is designed as a volume scatterer. A volume scatterer is preferable over a surface scatterer because the radar signal can be refracted and hence disturbed at each refractive index jump and at each surface unevenness.

While the first diffuser should illuminate the pixel as uniformly as possible, the emission/scattering characteristic of the second diffuser can be chosen such that light from the indication element, for example a front display, is emitted only into a desired solid angle in front of the vehicle. For example, it makes little sense to radiate light downwardly in front of the vehicle since under normal circumstances no one who would observe this display can be found there. Thus, in the ideal case, the emission characteristic of the second diffuser is for example chosen such that only the upper quarter space in front of the indication element is realized as emission direction. This can significantly increase its energy efficiency.

Expressed more generally, the second diffuser of each pixel of a specific configuration has a scattering characteristic in which a beam volume emanating from this pixel is restricted to a predetermined partial space, in particular approximately one half or one third or one quarter of the half space located in front of the indication element, in order to save light energy and only scatter into a partial space actually usable by vehicle-external users.

As already mentioned, all the supply lines—if the indication element comprises electrical supply lines to the indication light sources of the individual pixels—ideally extend in a predetermined supply line direction which is orthogonal (i.e., at right angles) to a linear polarization direction of the radar radiation of the vehicle's own radar system when the indication element is installed in the vehicle (cf. FIG. 4). The same can also be applied analogously in the alternative embodiment, in which deflection elements rather than indication light sources are installed in the pixels. Rather than electrical supply lines, suitable light guides, for example optical fibers and many more, are usable in this case.

According to an embodiment, the overall structure of the indication element yields a panel which during the installation in the vehicle should be arranged transversely, in particular orthogonal, to a propagation direction of the radar radiation emitted by the vehicle's own radar system and has a constant overall thickness in this propagation direction (for example, the aforementioned propagation direction can be a specified main propagation direction of the radar radiation, which may also vary locally along a vehicle front or other external vehicle side); and/or has smooth and preferably at least locally plane and mutually parallel surfaces transversely to the aforementioned propagation direction of the radar radiation (and in particular forms a plane-parallel panel in the ideal case); and/or is designed to be largely free from surface unevenness, air inclusions and other refractive index jumps (apart from the indication light sources or deflection elements which are integrated in the panel and, as described herein, dimensioned to be comparatively small) which would modify or interfere with the propagation direction and/or a beam profile of the radar radiation from the vehicle's own radar system when passing the indication element.

Since in principle any material passage influences the radar radiation (for example by damping, refraction, etc.), the aforementioned measures can mean that this influence at least remains homogeneous over the entire wavefront of the radar radiation and hence is not accompanied by any impediment to the radar signal recognition. Optionally, the aforementioned panel may be composed of various securely interconnected layers which carry various optical components described herein, for example as illustrated in FIG. 6.

In particular, the aforementioned constant overall thickness of the panel can be an integer multiple of half the radar wavelength in order to avoid damping of the radar radiation during the passage through the indication element, which is to say the panel, or at least reduce this to a negligible minimum.

In particular, each individual pixel of the indication element can be shielded from the respective adjacent pixels by light-absorbing side faces or separation layers, in order to prevent crosstalk of the light from a light to a dark pixel and hence maintain a contrast between the individual pixels that is as high as possible. For similar reasons, back sides of the pixels may alternatively or additionally also have a light-absorbing embodiment, optionally with a cutout for an indication light source arranged in the pixel back side or a deflection element or a first diffuser.

As already mentioned, the indication element may be designed in particular as an external display for dynamically indicating information content (for example communication messages with text or depiction for pedestrians or other vehicles, but also logos and light signatures, etc.) for observers situated outside of the vehicle; or a vehicle light indication for signaling a vehicle state, a driving state or a vehicle maneuvering intention of the vehicle to other road users, for example a turn-indicator lamp (i.e., direction of travel indicator), stop lamp or headlamp.

According to a further aspect, provision is made for a vehicle, in particular a motor vehicle or any other land vehicle, aircraft or watercraft. The vehicle comprises a vehicle's own radar system with a predetermined radar wavelength used therein. Further, a radar-compatible external indication device of the type presented herein is installed in the vehicle and designed such that its extensive indication element is arranged in the beam path of the vehicle's own radar system in a manner transversely, in particular orthogonal, to a propagation direction of the radar radiation emitted by the radar system without influencing or impeding the propagation of said radar radiation through the indication element. For example, the aforementioned propagation direction can be a specified main propagation direction of the radar radiation, which may also vary locally along a vehicle front or any other external vehicle side.

The aforementioned aspects of the invention and their embodiments and specific configurations are explained in detail below on the basis of examples depicted in the attached drawings. The drawings should be understood to be a schematic illustration of the fundamental design principle, which is to say not true to scale.

DETAILED DESCRIPTION OF THE DRAWINGS

Figure 1:
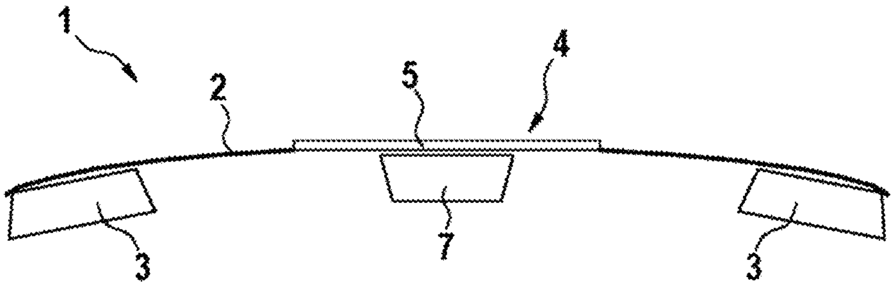
FIG. 1 shows a horizontal sectional illustration of a front end of a vehicle with a radar-compatible external indication device of the type presented herein, in the form of an external display, integrated in the beam path of a vehicle's own radar system.

FIG. 1 shows a front end 2 of a vehicle 1 according to an exemplary embodiment of the invention in a much simplified schematic sectional illustration along a horizontal plane spanned by a longitudinal and a transverse direction of the usual coordinate system that is stationary in relation to the vehicle. This is a motor vehicle in this example. The front headlamps 3 are indicated schematically on both sides of its front end 2. Approximately in the center therebetween, purely by way of example, a vehicle's own radar system 7 with a predetermined radar wavelength of approximately 4 mm in this example is integrated in the vehicle 1.

In the front end 2 of the vehicle 1, a radar-compatible external indication device 4 of the type presented herein is integrated directly in the beam path of the radar system 7. The external indication device 4 comprises an extensive indication element 5 in the form of an external display (a front display in this case), which is composed of a multiplicity of pixels 6 arranged next to one another, for example as depicted in FIGS. 2 to 6. In FIG. 1, the indication element 5 is arranged orthogonal to a main propagation direction of the radar radiation (not depicted separately) emitted by the radar system 7, the main propagation direction corresponding to the vehicle longitudinal direction in this example.

Since the requirements in respect of the display resolution of such a front display are incredibly low, it is possible to operate with very large pixels 6 with, purely by way of example, an edge length of approximately 5-15 mm (in the numerical example described herein). This enables a novel pixel design, which is explained and illustrated below on the basis of a few specific examples, with reference being made to FIGS. 2 to 6.

Figure 2:
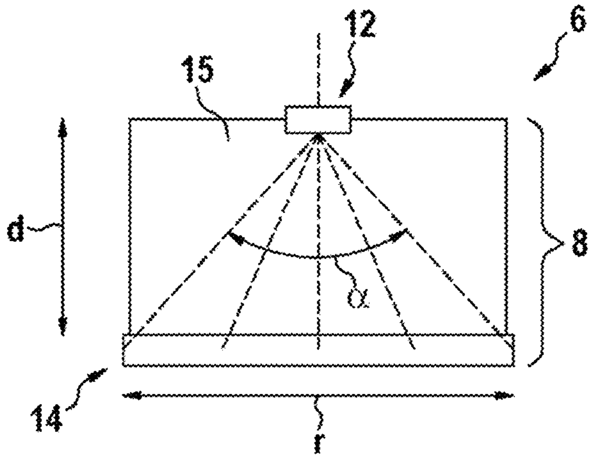
FIG. 2 shows an individual pixel of the external display from FIG. 1 in a longitudinal section along its surface normal.

In this case, FIG. 2 initially shows only a diffuser arrangement 8 which is contained in each individual pixel 6 of the indication element 5 from FIG. 1. In FIG. 2, the pixel 6 is depicted in a longitudinal section in the direction of its surface normal which may, but need not, correspond to its main emission direction at the same time. FIGS. 3*a*-3*c* show a few examples of possible pixel shapes and their mutual arrangement in the indication surface of the external display from FIG. 1, in a plan view in the direction of its surface normal. FIG. 4 shows a plan view of a back side of an exemplary pixel array according to FIG. 3*c* with indication light sources 9 (LEDs in this case) in each pixel with associated electrical supply lines. FIG. 5 shows a schematic illustration of an alternative example to FIG. 4, having deflection elements 10 and associated light guides 17 in back sides 20 of the individual pixels 6 rather than LEDs. Finally, FIG. 6 shows a schematic longitudinal sectional illustration of the external display from FIG. 5 along its surface normal.

According to FIG. 2, a core concept of the new pixel 6 consists of constructing a suitable diffuser arrangement 8 in the form of a sandwich made of two diffusers 12 and 14, which are connected in this example by a transparent solid body 15 (e.g., polycarbonate, glass, etc.) of a constant thickness d which corresponds to the distance of the two diffusers 12 and 14 from one another in the direction of the surface normal.

The first diffuser 12, which faces an indication light source 9 or a corresponding deflection element 10 (not depicted in FIG. 2, cf. FIGS. 4-6), is designed to be very small in this example with a lateral edge length or a diameter of significantly less than one millimeter. In this case, the first diffuser is configured such that it illuminates the observer-side pixel surface, which is formed by the second diffuser 14, as uniformly as possible. As illustrated in FIG. 2, the optimal emission angle α of the first diffuser 12 in this case varies with the thickness d of the transparent solid body 15 and an overall width r of the pixel 6 according to the following equation:

$$\alpha = 2 \cdot a\tan(r/(2 \cdot d))$$

From this, it is evident that the optimal scattering angle (emission angle α) increases when the solid body 15 becomes thinner, and the first diffuser 12 ideally has a virtually Lambertian scattering characteristic for very small d. Ideally, the luminous flux should be homogeneous within the emission angle α. To this end, the first diffuser 12 has what is known as a "hat top" scattering characteristic in this example. It is also advantageous if the first diffuser 12 is designed as a volume scatterer. The reasons for this are explained further below.

While the first diffuser 12 should illuminate the pixel 6 uniformly, the emission characteristic of the second diffuser 14 can be adapted such that the light is radiated only in a desired solid angle in front of the vehicle 1. For example, it makes little sense to radiate light downwardly in front of the vehicle 1 since under normal circumstances no one who would observe the display indication means can be found there. Thus, in the ideal case, the emission characteristic of the second diffuser 14 in the example according to FIG. 1 is chosen such that only the upper quarter space in front of the indication element 5 (front display) is realized as emission direction. This can further increase its efficiency.

Figure 3:
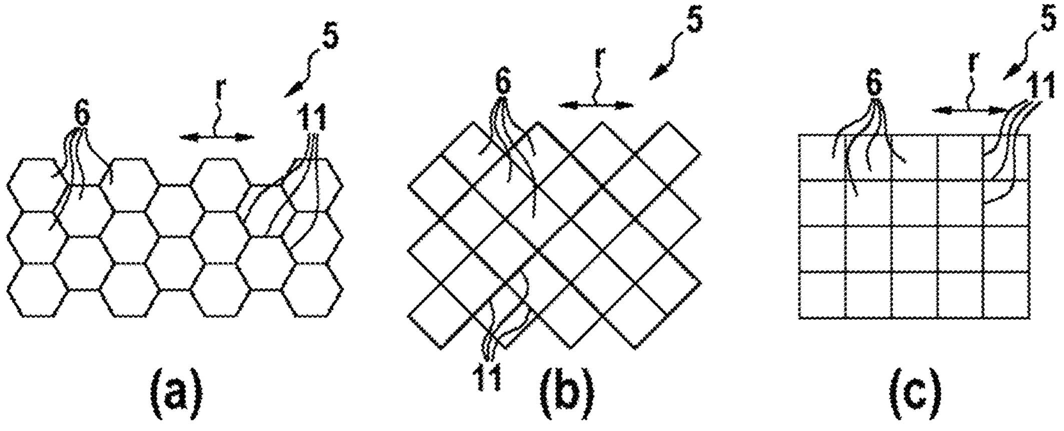
FIGS. 3*a*-3*c* show a few examples of possible pixel shapes and their mutual arrangement in the indication surface of the external display from FIG. 1, in a plan view in the direction of its surface normal.
Figure 4:
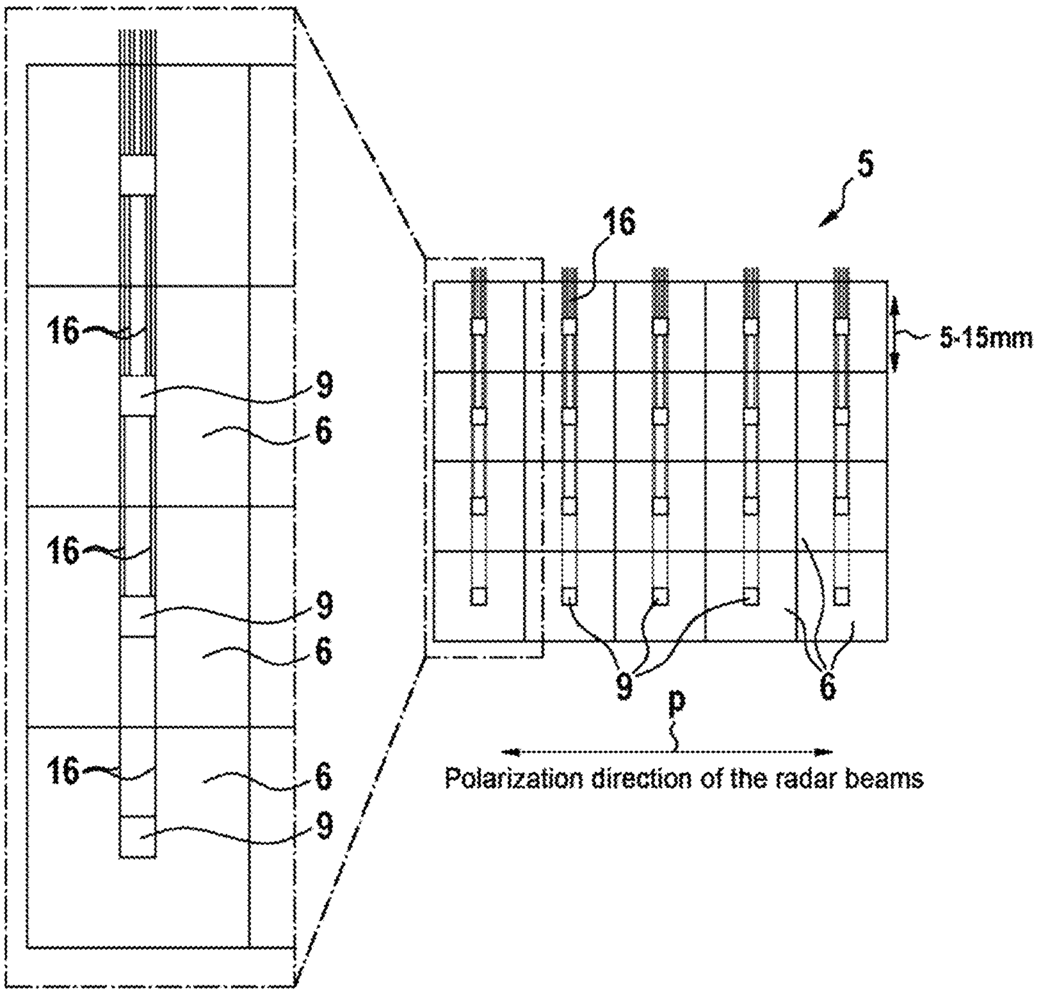
FIG. 4 shows a plan view of a back side of an exemplary pixel array according to FIG. 3*c* with LEDs in each pixel as indication light sources with associated electrical supply lines.
Figure 5:
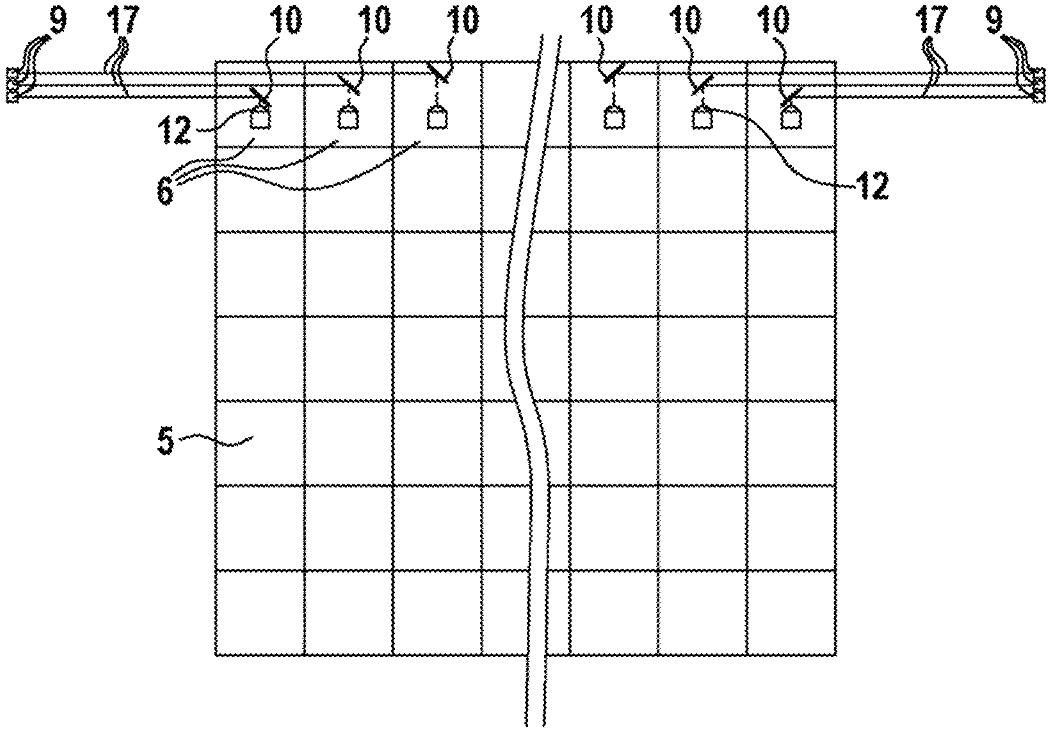
FIG. 5 shows a schematic illustration of an alternative example to FIG. 4, having deflection elements and associated light guides in place of LEDs in the back sides of the individual pixels.
Figure 6:
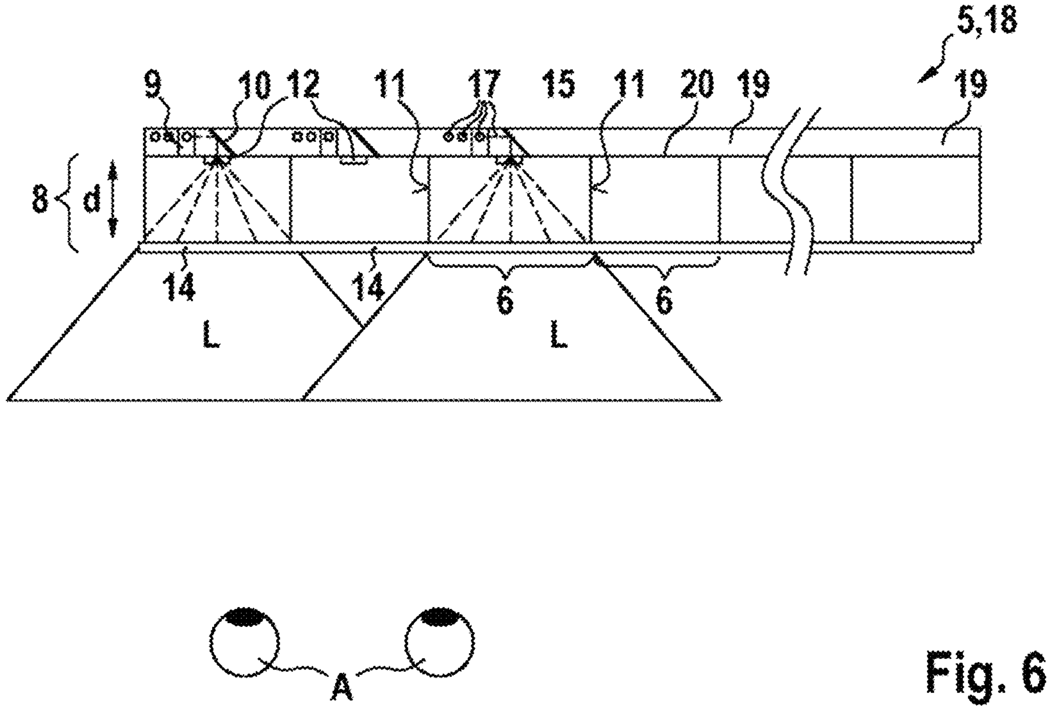
FIG. 6 shows a schematic longitudinal sectional illustration of the external display from FIG. 5 along its surface normal.

As illustrated in FIGS. 3*a* to 6 on the basis of a few examples, the indication element 5 of the radar-compatible external indication device 4 is created by arranging many such pixels 6 next to one another, with each pixel 6 being supplied with light by way of an indication light source 9, in this example an LED, assigned thereto (as depicted in FIGS. 4 to 6). FIGS. 3*a*, 3*b* and 3*c* schematically sketch out a few different examples of possible pixel shapes and their arrangement in the indication surface of the indication element 5 from FIG. 1. In this context, the shape and arrangement of the individual pixels 6 can be chosen freely as a matter of principle.

In this example, the side faces or separation layers 11 between the pixels 6 have a black absorbent configuration in order to prevent crosstalk of the light from a bright to a dark pixel 6 and hence maintain a contrast between the individual pixels 6 that is as high as possible. For the same reason, a back side 20 of the individual pixel 6 (cf. FIG. 6) ideally also has a black absorbent design, in this example with a cutout at the position of the first diffuser 12.

The diffuser arrangement 8 of the individual pixel 6 shown in FIG. 2 is not electrically conductive and hence transparent to the radar beams of the radar system 7. The problem of the electrically conductive LEDs and their supply lines arranged at the back side of the diffuser arrangement 8 is presently solved by the following requirements:

- Requirement 1: The size of the indication light sources 9 (LEDs in this case) integrated in the individual pixels 6 must be significantly smaller than the wavelength of the radar system 7. In the case of a typical radar at 76 GHz, the radar wavelength is approximately 4 mm (the numerical examples in this respect need to be scaled accordingly in the case of a different radar wavelength). Thus, the indication light sources 9 ideally have edge lengths of less than approximately 0.5 mm.
- Requirement 2: The distance between the individual indication light sources 9 should be greater than the radar wavelength, which is to say for example greater than 5 mm.
- Requirement 3: The electrical supply lines 16 to the individual indication light sources 9 run orthogonally (i.e., at right angles) to a linear polarization direction P of the radar radiation. This is illustrated in FIG. 4. As is evident in particular from the section to the left in FIG. 4 illustrated in enlarged fashion, each LED is contacted on an individual basis and can consequently also be switched on an individual basis.

If all these requirements are satisfied, then the assumption can be made that the indication element 5 has no significant negative influences on the radar function of the vehicle's own radar system 7 when the radar radiation passes therethrough. The same can also be applied analogously to the alternative embodiment, in which deflection elements 10 are installed in the pixels rather than the indication light sources 9 (cf. FIGS. 5 and 6). In particular, the third requirement can be dispensed with then because light guides 17, for example optical fibers and many more, made of electrically nonconductive material can be used in place of electrical supply lines 16 in that case.

As illustrated in FIG. 6 for example, it is particularly advantageous in this example to embed or apply the indication light sources 9 and their supply lines 16 (or deflection elements 10 and their light guides 17) within or on a transparent carrier layer 19 (a film, for example), which in turn is bonded to the back side 20 of the pixel array by means of an optically transparent bonding material. As a result, an indication element 5 in the form of a plane parallel panel 18 is obtained in this example, the latter also having a smooth surface, advantageous for the function of the radar, on the back side. Air inclusions in the panel 18 should also be avoided since the radar signal can be refracted and hence disturbed at each refractive index jump. This is also the reason for a volume scatterer being preferred over a surface scatterer for each diffuser 12 and 14 in the diffuser arrangement 8.

As shown schematically in FIG. 5, the indication light sources 9, for example LEDs, can be placed outside of the pixel array and hence outside of the indication element 5 in this embodiment, with the light of the individual LEDs being guided via light guides 17 (such as optical fibers and the like) to the respective pixels 6. The deflection elements 10 can be implemented as dichroic mirrors.

The schematic side view in FIG. 6 shows an exemplary arrangement corresponding to that in FIG. 5. The entire structure with the mirror surfaces of the deflection elements 10 and associated light guides 17 can be embedded in a transparent plastic in order to obtain a smooth surface in the region of the emergence of the radar beams. FIG. 6 also indicates a light beam volume L emanating from each individual pixel 6 of the indication element 5, the light beam volume transporting light generated therein or the corresponding indication content to the eyes A of an observer standing in front of the vehicle 1 (see FIG. 1).

LIST OF REFERENCE SIGNS

1 Vehicle
2 Front end of the vehicle
3 Headlamp
4 External indication device
5 Extensive indication element
6 Individual pixel of the extensive indication element
7 Vehicle's own radar system
8 Diffuser arrangement of an individual pixel
9 Indication light source associated with a pixel
10 Deflection element associated with a pixel
11 Light-absorbing side faces or separation layers between adjacent pixels
12 First diffuser
14 Second diffuser
15 Transparent solid body
16 Electrical supply lines
17 Light guide
18 Panel
19 Transparent carrier layer
20 Back side of a pixel or of the entire pixel array
α Emission angle of the first diffuser
d Distance between the first and the second diffuser
r Lateral dimension (or overall width) of the second diffuser and of the pixel
A Eyes of a user of the external indication device
L Light beam volume emanating from a pixel of the indication element
P Linear polarization direction of the radar radiation

The invention claimed is:

1. A radar-compatible external indication device for a vehicle, comprising:
- an indication element that generates a vehicle external light display and is configured to be arranged in a beam path of a radar system of the vehicle, wherein the indication element includes a plurality of arrayed pixels, each pixel comprising:
  - a diffuser arrangement that is radar beam transparent, and
  - an electronically controllable indication light source or deflection element on a back side of the pixel,
- wherein the deflection element deflects light from an indication light source arranged away from the indication element into a predetermined main emission direction of the indication element,
- wherein the linear dimensions of the indication light source or deflection element is multiple times smaller than a predetermined wavelength used in the radar system, and
- wherein the distances between adjacent indication light sources or deflection elements are greater than the predetermined wavelength.

2. The external indication device according to claim 1,
- wherein the diffuser arrangement of each pixel is designed as a sandwich arrangement made of a first diffuser and a second diffuser, which are secured at a predetermined distance from one another in the direction of a surface normal of the pixel, via being interconnected by a transparent solid body,
- wherein the first diffuser follows the indication light source or the deflection element in the light propagation direction and is configured to distribute the light generated by the indication light source substantially uniformly over an entire surface of the second diffuser, so as to yield an entire surface of the pixel and, for the purpose of generating the display, has a predetermined front-side emission characteristic for the indication light incident on the back side.

3. The external indication device according to claim 2, wherein the first diffuser of each pixel:
- has a scattering characteristic with a substantially homogeneous luminous flux within its emission angle which covers the entire surface of the second diffuser and/or has a scattering characteristic with a substantially vanishing luminous flux outside of this emission angle, and/or
- is designed as a volume scatterer, and/or
- has lateral dimensions in the surface direction of the indication element which approximately correspond to those of the associated indication light source or associated deflection element.

4. The external indication device according to claim 2, wherein the second diffuser of each pixel has a scattering characteristic in which a beam volume emanating from the pixel is restricted to a predetermined partial space of the half space located in front of the indication element, to approximately one half of the half space.

5. The external indication device of claim 1, wherein the indication element comprises electrical feed lines which lead to the indication light sources of the individual pixels and which all extend in a predetermined supply line direction which is orthogonal to a linear polarization direction of the radar radiation of the radar system when the indication element is installed in the vehicle.

6. The external indication device according to claim 1, wherein the overall structure of the indication element yields a panel which:
- is configured to be arranged transversely to a propagation direction of the radar radiation emitted by the radar system and has a constant overall thickness in the propagation direction, and/or
- has smooth and at least locally plane and mutually parallel surfaces transversely to the propagation direction of the radar radiation, and/or
- is substantially free from surface unevenness, air inclusions and other refractive index jumps which could modify or interfere with the propagation direction and/or a beam profile of the radar radiation from the radar system when passing the indication element.

7. The external indication device according to claim 6, wherein the constant overall thickness of the panel in the propagation direction of the radar radiation is an integer multiple of half the radar wavelength.

8. The external indication device according to claim 1, wherein:
- each pixel is shielded by light-absorbing side faces or separation layers from the respective adjacent pixels, and/or a back side of each pixel has a cutout at the position of an associated indication light source arranged in the back side or of a deflection element or of a first diffuser.

9. The external indication device according to claim 1, wherein the indication element comprises:

an external display for dynamically indicating information content for observers situated outside of the vehicle, and/or a vehicle light indication for signaling a vehicle state, a driving state or a vehicle maneuvering intention of the vehicle to other road users.

10. A motor vehicle, comprising:

a radar system with a predetermined radar wavelength; and an external indication device arranged in a beam path of the radar system and orthogonal to a propagation direction of a radar radiation emitted by the radar system through an indication element of the external indication device, wherein the indication element generates a vehicle external light display and includes a plurality of arrayed pixels, each pixel comprising:

a diffuser arrangement that is radar beam transparent, and an electronically controllable indication light source or deflection element on a back side of the pixel, wherein the deflection element deflects light from an indication light source arranged away from the indication element into a predetermined main emission direction of the indication element, wherein the linear dimensions of the indication light source or deflection element is multiple times smaller than a predetermined wavelength used in the radar system, and wherein the distances between adjacent indication light sources or deflection elements are greater than the predetermined wavelength.

* * * * *